No. 709,899. Patented Sept. 30, 1902.
H. E. GRANT.
PROCESS OF BRAZING.
(Application filed May 11, 1900.)
(No Model.)
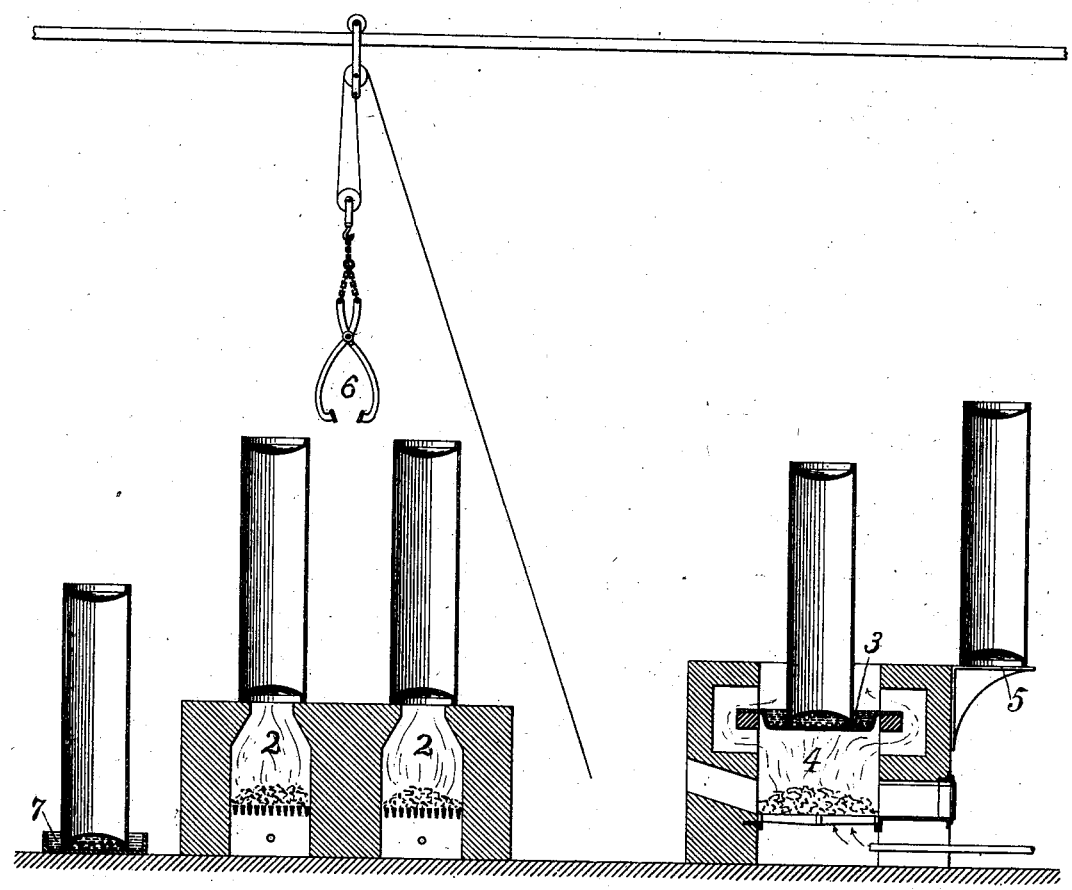
WITNESSES
INVENTOR

UNITED STATES PATENT OFFICE.

HORACE E. GRANT, OF PITTSBURG, PENNSYLVANIA.

PROCESS OF BRAZING.

SPECIFICATION forming part of Letters Patent No. 709,899, dated September 30, 1902.

Application filed May 11, 1900. Serial No. 16,308. (No specimens.)

*To all whom it may concern:*

Be it known that I, HORACE E. GRANT, of Pittsburg, in the county of Allegheny and State of Pennsylvania, have invented a new and useful Improvement in Processes of Brazing, of which the following is a full, clear, and exact description, reference being had to the accompanying drawing, forming part of this specification, in which the figure represents a sectional side elevation showing apparatus arranged for carrying out my improved process.

My invention relates to the art of brazing, and more particularly to the brazing of heads or ends in cylinders or tanks, and it is designed to provide a simple and cheap process therefor.

Heretofore in brazing the ends or heads in cylinders or tanks it has been necessary to turn up an outer flange on the head around the end of the shell to form an annular cup, into which the hard solder is placed and melted, the cup-flange holding the solder to form the joint. My invention does away with the necessity for this cup-flange and enables the cylinder to be dipped in a brazing-bath. In dipping such cylinders with the head in place in a bath of molten metal I have found that the expansion of the cylinder will cause it to leave the flange of the head at some point around the circumference, thus preventing the brazing being done in this way, as a hole would be left at some point between the head and shell. I have further discovered that by heating the central portion of the head before the cylinder and head are dipped into the bath this difficulty is removed and a perfect joint obtained; and my invention consists, broadly, in thus heating the head, or at least the central part thereof, and then dipping in the bath of molten metal.

I show in the drawing one form of apparatus for carrying out my invention, 2 2 representing forge-fires or furnaces, over which the cylinders with the heads in place are set to heat the center of the head. After thus heating the heads the cylinder is dipped into the bath 3, which is heated by a suitable furnace 4, the end of the cylinder being dipped to the depth of the flange and allowed to remain until the parts are substantially of the same temperature, when it is allowed to cool, preferably by setting it on a cooling-plate 5. I have shown two of the preheating-furnaces, and prefer to use more than one, so as to more rapidly supply cylinders to the brazing-bath. To assist in handling the cylinders, I preferably use tongs 6, carried upon an overhead track.

In carrying out my invention after the head is inserted I preferably insert the cylinder in a pan 7, containing a solution or flux. The cylinder is then placed over one of the preheating-forges, another cylinder following and being placed on the other forge. When the head is sufficiently heated, the cylinder is picked up by the grapple and placed in the dipping-pot and another cylinder transferred from the flux-pan to the preheating-forge. The cylinder then being removed from the dipping-pot to the cooling-shelf, another cylinder is transferred from the forge-fire to the pot, the process being carried on continuously.

The advantages of my invention result from the heating of the heads before dipping, since this enables a continuous perfect joint to be obtained, which could not be done if the cylinder were dipped without such preheating of the head.

Many changes may be made in the apparatus for carrying out my invention.

I claim—

1. The process of brazing heads in cylinders or tanks consisting in heating the head to at least a red heat, and then dipping into a pot of molten brazing metal; substantially as described.

2. The method of brazing heads in cylinders or tanks, consisting in placing the heads within the end of the cylinder, heating the central portion of the head to at least a red heat and then dipping the flanges into a pot of molten brazing metal; substantially as described.

In testimony whereof I have hereunto set my hand.

HORACE E. GRANT.

Witnesses:
  H. M. CORWIN,
  CHAS. C. BITTNER.